Feb. 14, 1933.  J. G. WEIR  1,897,092
AIRCRAFT WITH ROTATIVE WINGS
Filed Nov. 26, 1929
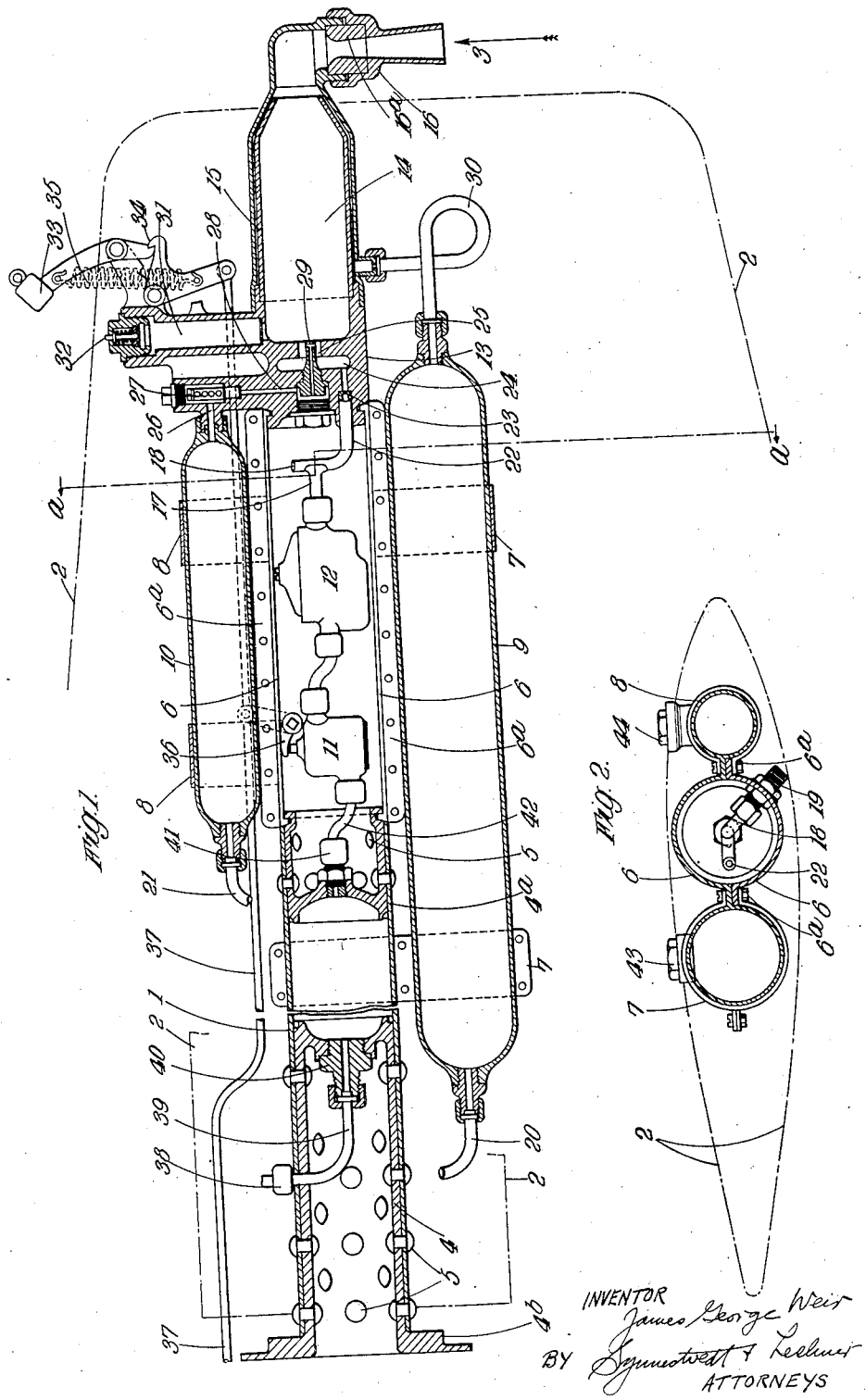
INVENTOR
James George Weir
BY
ATTORNEYS Patented Feb. 14, 1933

1,897,092

UNITED STATES PATENT OFFICE

JAMES GEORGE WEIR, OF ALDWYCH, LONDON, ENGLAND, ASSIGNOR, BY MESNE ASSIGNMENTS, TO AUTOGIRO COMPANY OF AMERICA, OF PHILADELPHIA, PENNSYLVANIA, A CORPORATION OF DELAWARE

AIRCRAFT WITH ROTATIVE WINGS

Application filed November 26, 1929, Serial No. 409,814, and in Great Britain January 11, 1929.

This invention relates to aircraft with rotative wings or supporting surfaces, or lifting air screws, and has for its primary object the provision of improved means of applying power thereto to start or maintain them in rotation.

According to the present invention a turning effort is applied to one or more of the wings of a rotative supporting or lifting system by means of one or more jet reaction devices incorporated in or carried by the wing or wings themselves. The said jet reaction devices may obtain their propulsive force by the ejection of any suitable fluid, for instance compressed air, steam, or water under pressure.

In order to increase the kinetic energy of the ejected fluid or fluids means may be provided for burning a suitable liquid fuel, for instance paraffin, petrol or other hydrocarbon or fuel alcohol, and applying the heat evolved for the generation of steam at a suitable pressure, and utilizing the generated steam together with the products of combustion as the fluid to be ejected by the jet reaction devices, the total available energy of the combined gases being converted to the kinetic form by expanding them in jet reaction nozzles of the convergent-divergent or de Laval type hereinafter referred to as Venturi nozzles.

By making arrangements for constant supplies of the reacting fluid or fluids, for instance through the shaft of the rotating wing or lifting air-screw system and suitable glands to the wings, blades or air-screws themselves, the invention may be used for continuously rotating the wings or air-screws during flight, it being understood that where energy is supplied by combustion the combustion may be made to take place in organs attached to or contained within the rotating wings or air-screws themselves, the air, fuel and water being supplied continuously as above described. The invention however is more especially applicable to the initial starting of wing systems such as those of the Cierva type which are normally rotated in flight by the action of the relative air flow. In such cases a sufficient quantity of the reacting fluid or fluids for starting purposes may be stored within the structure of each wing or blade without having to arrange for continuous supplies from the body of the aircraft.

In order that the present invention may be more fully understood and readily carried into effect one form of construction will be described with reference to the accompanying drawing, of which Fig. 1 is a plan view partly in section and broken in the middle, of the main structural member of a rotating wing of an aircraft of the type having freely rotative wings together with apparatus according to this invention for rotating said wing by jet reaction and showing, in outline, parts of the tip and root of the rotating wing.

Fig. 2 is a section looking in the direction of the arrows along the line $a-a$ in Fig. 1.

In Figs. 1 and 2, 1 is the main structural member or spar, formed of solid drawn tubing, of a rotative wing of an aircraft of the type referred to, the outline of such wing being shown at 2 and the direction of rotation by the arrow 3, the centre of rotation being to the left in Fig. 1.

4 and $4^a$ are plugs or headers attached to the tubular member or spar by rivets 5. The plug 4 has formed on it a flange $4^b$ for attachment to a member forming part of the rotating hub. The space within the tubular spar 1 enclosed by the headers 4 and $4^a$ forms a container for compressed air which may be charged by means of the union 38, the pipe 39 and the screwed plug 40 which is screwed into the header 4. A suitable pressure to which the tubular spar or container may be charged is from 1500 to 2000 lbs. per sq. in. Attached by a bayonet joint to the header $4^a$ is a cylindrical casing 6 having the same external diameter as the tubular spar 1 and formed in two halves by a longitudinal division, such halves being bolted together by means of longitudinal flanges. 7 and 8 are clips attached by bolts to the tubular spar 1 and to the casing 6 and holding metal bottles 9, 10, of which the larger 9 is to hold water and the smaller 10 to hold liquid fuel. The casing 6 carries within it a controllable valve 11 operated by a bell crank lever 36 and a pressure reducing valve 12. At its outer end the casing 6 is attached by a bayonet joint to the body 13 to which in turn is attached in prolongation of the tubular spar 1 and the casing 6 the double walled cylindrical chamber 14, the inner space of which forms the combustion chamber, and the annular space 15 between the two walls the evaporating chamber.

The chamber 14 and the annular space 15 both communicate with the convergent-divergent, de Laval or Venturi nozzle 16, directed rearwardly with respect to the direction of rotation of the rotating wing. The header 4ª carries a union 41 which communicates by means of a pipe 42 with the controllable valve 11 which in turn communicates by way of the pressure reducing valve 12 with a branched pipe 17, which communicates in turn with two pipes 18 and 22, of which the pipe 18 communicates with a union 19 (see Fig. 2). The pressure reducing valve 12 may conveniently be designed to reduce the pressure of the air to between 300 and 400 lbs. per sq. in. To the union 19 is attached a pipe (not shown in Fig. 2) the other end of which has two branches 20 and 21, communicating respectively with the water bottle 9 and the fuel bottle 10. The pipe 22 communicates with a passage in the body 13 having a choke or plug 23 with a very small hole in it. This passage in the body 13 leads to an annular chamber 24 communicating with the mixing nozzle 25. The fuel bottle 10 is screwed at its outer end to the body 13 and communicates, by the passage 26 in the body 13, with a recess containing a filter 27 and communicating by means of a passage 28 with the spraying nozzle 29 which delivers atomized fuel into the mixing nozzle 25. The water bottle 9 carries at its outer end a union securing a pipe 30 by which the water bottle 9 communicates with the evaporating chamber 15. Formed in the body 13 is a recess or holder 31 for holding a firing cartridge, the top of said recess 31 being fitted with a screwed plug carrying a striker pin 32. Separately pivoted to an arm on the body 13 are a hammer 33 and a trigger 34 engaging with the hammer 33 and connected thereto by the spring 35. To an arm on the trigger 34 is attached a rod 37, which is also attached to one arm of the bell crank lever 36 pivoted within the casing 6 and operating the controlled valve 11.

Referring to Fig. 2, 43 and 44 are screw plugs closing the filling orifices of the bottles 9 and 10.

The method of operation is as follows. The bottles 9 and 10 are filled with water and a suitable liquid fuel, (for instance paraffin or petrol) respectively, and the air vessel 1 is filled with compressed air by means of the connections 38, 39, and 40 to a predetermined pressure and an igniting cartridge is placed in the holder 31. The hammer 33 is drawn back until its tail engages with the hook of the trigger 34. The apparatus is now ready for use. To start the generation of steam and the jet reaction hereinafter called the "blow" the rod 37 is pulled to the left in Fig. 1—that is, towards the centre of the rotating wings. This may be done in a variety of ways. For instance the rod 37 may be drawn to the left by spring means which are held out of action by a cotter pin which is withdrawn by means of any suitable system of strings, chains, cables, rods and/or levers under the control of the pilot of the aircraft, so arranged that the operation of one member by the pilot of the aircraft withdraws all four cotter pins, one for each rotating wing or blade, thus allowing all four of the rods 37 to be simultaneously drawn towards the centre of the rotating wings by spring means. The rod 37 in being drawn to the left in Fig. 1 opens the valve 11 by means of the bell crank lever 36 and causes the trigger 34 to release the tail of the hammer 33 which is brought down hard on the striker pin 32 by the spring 35. The striker pin fires the cartridge in the recess 31 and the cartridge proceeds to burn for an appreciable time.

At the same time the opening of the valve 11 admits air from the air container or tubular spar 1 by means of the union 41, the valve 11, and the pressure reducing valve 12 to the pipe 17, whence it is delivered by the pipe 18, the union 19, and the branch pipes 20, 21 to the water and fuel bottles 9 and 10, thus forcing fuel to the mixing nozzle 25, by way of the passage 26, the filter 27, the passage 28, and the spraying nozzle 29, and water to the evaporating space 15 by way of the pipe 30. Air is also delivered from the pipe 17 by way of the pipe 22, the choke 23 and the annular chamber 24 to the mixing nozzle 25, the pressure of the air in the mixing nozzle being somewhat reduced below that in the fuel and water bottles by the "choke". This ensures that the pressure of the air in the nozzle 25 and the combustion chamber 14 shall not overcome the pressure in the bottles and prevent or hinder the flow of fuel and water.

The fuel issuing from the spraying nozzle 29 is thoroughly atomized and mixes intimately with the air in the mixing nozzle 25, whence the fuel-air mixture issues into the combustion chamber 14, where it is ignited by the flame from the cartridge in the recess 31. Water flowing into the evaporating space 15 from the pipe 30 is rapidly converted into steam by the hot gases in the combustion chamber 14 and the steam produced together with the products of combustion pass into the jet reaction nozzle 16 in which they are expanded and their energy converted to the kinetic form and from which the combined gases are ejected at high velocity and produce a propulsive force by the reaction on the nozzles.

The nozzles 16 are made in two halves screwed together, and the throat part of each nozzle is formed of a separate piece of metal 16ª to facilitate replacement, interchangeability and minor modifications in the jets, it being possible to have a series of throat pieces 16ª differing slightly in throat diameter and divergency angle and all capable of being fitted in the nozzle 16, replacement being effected by unscrewing the two halves of the nozzle 16 whereupon the throat part 16ª may easily be slipped in or out and changed and the two parts of the nozzle 16 screwed together again.

The sizes of the air containers and fuel and water bottles are so determined that the "blow" lasts long enough to give sufficient initial rotation to the rotative wings to enable the air craft to get off the ground with the minimum possible run and so that the fuel and water bottles are exhausted shortly before the air vessel in order that no water or fuel may remain in the bottles at the end of the "blow".

When the apparatus as described above has been used to give an initial rotation to the wings of an aircraft of the type having freely-rotative wings the bottles containing the fuel and water will be empty and the air containing vessel will require refilling with compressed air. The fuel and water bottles may have filling orifices with large plugs, and although the air vessel may be replenished with compressed air from an external source prior to beginning the next flight, an air compressor driven by the main engine of the aircraft may be provided having connections to the air vessels which may be either detachable or carried through glands in the hub of the rotating wings. These connections may conveniently comprise non-return valves or positive valves manually operated.

Since an aircraft of the type referred to usually has four rotating wings or blades and it is important that these should be in perfect static and dynamic balance it is preferable that the apparatus constructed according to this invention should comprise four jet reaction units each complete in itself with the necessary containers, steam generators, igniters, Venturi nozzles and accessory piping and valves, one unit being comprised in each of the rotating wings or blades, the starting controls for each unit being operated by a common control organ in the pilot's cockpit.

Alternatively electrical or other suitable means may be provided for igniting the fuel-air mixture.

What I claim is:—

1. In an aircraft a system of rotative wings or supporting surfaces or lifting airscrews having fluid jet reaction devices embodying means for generating steam at a suitable pressure, and discharge nozzles of a type adapted to utilize the generated steam expansively for producing the required jet reaction, such means for generating steam comprising a vessel or vessels in which air or oxygen may be stored at a high pressure, vessels for the storage of water and liquid fuel, a combustion chamber, one or more mixing and atomizing nozzles through which air and atomized liquid fuel are discharged into the combustion chamber, an evaporating chamber, and controllable means for admitting the fuel-air mixture to the mixing nozzles and igniting same.

2. In an aircraft a system of rotative wings or supporting surfaces or lifting airscrews embodying means for generating steam comprising a vessel or vessels in which air or oxygen may be stored at a high pressure, vessels for the storage of water and liquid fuel, a combustion chamber, one or more mixing and atomizing nozzles through which air and atomized liquid fuel are discharged into the combustion chamber, an evaporating chamber, controllable means for admitting the fuel-air mixture to the mixing nozzles and igniting same, and expansion nozzles of the Venturi type adapted to discharge a mixture of the generated steam and the products of combustion rearwardly with respect to the direction of rotation and to produce a jet reaction force and so to turn the wings or blades of the aircraft.

3. In an aircraft a system of rotative wings or supporting surfaces or lifting airscrews embodying means for generating steam at a suitable pressure and jet reaction nozzles adapted to apply a turning movement to said wings or blades, said means for generating steam comprising a vessel or vessels in which air or oxygen may be stored at high pressure, vessels for the storage of water and liquid fuel, a combustion chamber of cylindrical form, one or more mixing and atomizing nozzles through which air and atomized liquid fuel are discharged into the combustion chamber, an annular evaporating chamber surrounding the combustion chamber and communicating with the combustion chamber at a part distant from the fuel-air mixing nozzles and close to a port or duct leading to the combustion chamber and to the discharge nozzles.

4. In an aircraft a system of rotative wings or supporting surfaces or lifting airscrews embodying means for generating steam, and jet reaction nozzles adapted to apply a turning movement to said wings or blades, said means for generating steam comprising a vessel or vessels in which air or oxygen may be stored at a high pressure, vessels for the storage of water and liquid fuel, a combustion chamber, one or more mixing and atomizing nozzles through which air and atomized liquid fuel are discharged into the combustion chamber, an evaporating chamber, and controllable means for admitting compressed air to the mixing nozzles and to the water and fuel vessels and passages by which the water and fuel may be forced by the compressed air to the mixing nozzles and evaporating chamber respectively and controllable means for igniting the fuel-air mixture.

5. In an aircraft a system of rotative wings, supporting surfaces or lifting airscrews in accordance with claim 4 including a "choke" or constriction in the delivery pipe from the air container to the mixing nozzles.

6. In an aircraft a system of rotative wings, supporting surfaces or lifting airscrews in accordance with claim 4 including a pressure reducing valve in the air delivery pipe between the air vessel and the connections adapted to admit the compressed air to the fuel and water vessels and to the mixing nozzles.

7. In an aircraft a system of rotative wings or supporting surfaces or lifting airscrews embodying means for generating steam, jet reaction nozzles adapted to apply a turning movement to said wings or blades of said aircraft, and structural members adapted to carry the loads imposed on said wings or blades during flight and adapted to be used as containers for air or oxygen at high pressure, said means for generating steam comprising vessels for the storage of water and liquid fuel, a combustion chamber, one or more mixing and atomizing nozzles through which air and atomized liquid fuel are discharged into the combustion chamber, an evaporating chamber, and controllable means for admitting compressed air to the mixing nozzles and to the water and fuel vessels and passages by which the water and fuel may be forced by the compressed air to the mixing nozzles and evaporating chamber respectively and controllable means for igniting the fuel-air mixture.

8. An aircraft having a system of rotative wings or supporting surfaces or lifting airscrews embodying means for generating steam comprising a vessel or vessels in which air may be stored at a high pressure, vessels for the storage of water and liquid fuel, a combustion chamber, one or more mixing and atomizing nozzles through which air and atomized liquid fuel are discharged into the combustion chamber, an evaporating chamber, controlling means for admitting the fuel-air mixture to the mixing nozzles and igniting same, expansion nozzles of the Venturi type adapted to discharge a mixture of the generated steam and the products of combustion rearwardly with respect to the direction of rotation and to produce a jet reaction force and so to turn the wings or blades of the aircraft, and an air compressor driven by the main engine of the aircraft and adapted to deliver air at high pressure to a vessel carried in the body of the aircraft and a detachable connection from said vessel to the air vessels embodied in the said wings or blades of the aircraft whereby the vessels in the said wings or blades may be filled with compressed air when the aircraft is at rest on the ground.

9. An aircraft having a system of rotative wings or supporting surfaces or lifting airscrews embodying means for generating steam comprising a vessel or vessels in which air may be stored at a high pressure, vessels for the storage of water and liquid fuel, a combustion chamber, one or more mixing and atomizing nozzles through which air and atomized liquid fuel are discharged into the combustion chamber, an evaporating chamber, controllable means for admitting the fuel-air mixture to the mixing nozzles and igniting same, expansion nozzles of the Venturi type adapted to discharge a mixture of the generated steam and the products of combustion rearwardly with respect to the direction of rotation and to produce a jet reaction force and so to turn the wings or blades of the aircraft, an air compressor driven by a windmill exposable to the relative air flow during flight and adapted to deliver air at high pressure to a vessel carried in the body of the aircraft and a detachable connection from said vessel to the air vessels embodied in the said wings or blades of the aircraft whereby the vessels in the said wings or blades may be filled with compressed air when the aircraft is at rest on the ground.

10. An aircraft having a system of rotative wings or supporting surfaces of lifting airscrews embodying means for generating steam comprising a vessel or vessels in which air or oxygen may be stored at a high pressure, vessels for the storage of water and liquid fuel, a combustion chamber, one or more mixing and atomizing nozzles through which air and atomized liquid fuel are discharged into the combustion chamber, an evaporating chamber, controllable means for admitting the fuel-air mixture to the mixing nozzles and igniting same, expansion nozzles of the Venturi type adapted to discharge a mixture of the generated steam and the products of combustion rearwardly with respect to the direction of rotation and to produce a jet reaction force and so to turn the wings or blades of the aircraft, and an air compressor driven by the main engine of the aircraft and adapted to deliver air at high pressure by means of a connection or connections passing through glands in the rotative hub of the said rotative wings or blades to the air vessels embodied in said wings or blades.

11. In an aircraft a system of rotative wings or supporting surfaces or lifting airscrews having fluid jet reaction devices embodying means for generating steam at a suitable pressure, and discharge nozzles of a type adapted to utilize the generated steam expansively for producing the required jet reaction, such means for generating steam comprising a vessel or vessels in which air or oxygen may be stored at a high pressure, vessels for the storage of water and liquid fuel, a combustion chamber, one or more mixing and atomizing nozzles through which air and atomized liquid fuel are discharged into the combustion chamber, an evaporating chamber, controllable means for delivering the fuel-air mixture to the mixing nozzles, and one or more cartridges containing a suitable igniting compound fired by percussion caps and adapted to ignite the fuel-air mixture in the said combustion chamber.

12. In an aircraft a system of rotative wings or supporting surfaces or lifting airscrews having fluid jet reaction devices embodying means for generating steam at a suitable pressure, and discharge nozzles of a type adapted to utilize the generated steam expansively for producing the required jet reaction, such means for generating steam comprising a vessel or vessels in which air or oxygen may be stored at a high pressure, vessels for the storage of water and liquid fuel, a combustion chamber, one or more mixing and atomizing nozzles through which air and atomized liquid fuel are discharged into the combustion chamber, an evaporating chamber, controllable means for delivering the fuel-air mixture to the mixing nozzles, and electrical means under the control of the pilot of the aircraft adapted to ignite the fuel-air mixture in the said combustion chamber.

13. In an aircraft a system of rotative wings or supporting surfaces or lifting airscrews having fluid jet reaction devices embodying means for generating steam at a suitable pressure, and discharge nozzles of a type adapted to utilize the generated steam expansively for producing the required jet reaction, such means for generating steam comprising a vessel or vessels in which air or oxygen may be stored at a high pressure, vessels for the storage of water and liquid fuel, a combustion chamber, one or more mixing and atomizing nozzles through which air and atomized liquid fuel are discharged into the combustion chamber, an evaporating chamber, and means controlled by the pilot of the aircraft adapted simultaneously to operate the admission of air, fuel and water to the combustion chambers and evaporating chambers respectively and to effect the ignition of the fuel-air mixture.

14. In an aircraft a system of rotative wings or supporting surfaces or lifting airscrews embodying means for generating steam comprising vessels for the storage of water and liquid fuel, structural members adapted to carry the loads imposed on said wings or blades during flight and adapted to be used as containers for air or oxygen at a high pressure, said means for generating steam comprising vessels for the storage of water and liquid fuel, a combustion chamber of cylindrical form, one or more mixing and atomizing nozzles through which air and atomized liquid fuel are discharged into the combustion chamber, an annular evaporating chamber surrounding the combustion chamber and communicating with it at a part distant from the fuel-air mixing nozzles, expansion nozzles of the Venturi type adapted to discharge a mixture of the generated steam and the products of combustion rearwardly with respect to the direction of rotation and to produce a jet reaction force and so to turn the wings or blades of the aircraft, controllable means for admitting compressed air to the mixing nozzles and the water and fuel vessels and passages by which the water and fuel may be forced by the compressed air to the mixing nozzles and evaporating chamber respectively, a choke or constriction in the delivery pipe from the air-containing members to the mixing nozzles, a pressure reducing valve in the air delivery pipe between the air-containing members and the connections adapted to admit the compressed air to the fuel and water vessels and to the mixing nozzles, one or more cartridges containing a suitable igniting compound adapted to ignite the fuel-air mixture in the combustion chamber and fired by percussion caps, and means for firing said cartridges operatively connected to the controllable means for admitting compressed air to the fuel and water bottles and to the mixing nozzles, and adapted to fire the cartridges simultaneously with the said admission of compressed air.

JAMES GEORGE WEIR.